United States Patent [19]

Stanley et al.

[11] Patent Number: 4,773,128

[45] Date of Patent: Sep. 27, 1988

[54] APPARATUS AND METHODS OF STUFFING FOOD CASINGS TO PROVIDE DIMENSIONALLY UNIFORM PRODUCTS

[75] Inventors: Thomas R. Stanley, Danville; Mark R. Zeleznik, Oak Forest, both of Ill.

[73] Assignee: Teepak, Inc., Oak Brook, Ill.

[21] Appl. No.: 117,480

[22] Filed: Nov. 12, 1987

Related U.S. Application Data

[63] Continuation-in-part of Ser. No. 2,831, Jan. 13, 1987, Pat. No. 4,709,450.

[51] Int. Cl.[4] .................................... A22C 11/02
[52] U.S. Cl. ................................. 17/49; 17/33
[58] Field of Search ................... 17/33, 49, 41, 42

[56] References Cited

U.S. PATENT DOCUMENTS

| 4,017,941 | 4/1977 | Raudys et al. | 17/41 |
| 4,044,425 | 8/1977 | Nausedas | 17/35 |
| 4,335,488 | 6/1982 | Becker | 17/33 |
| 4,528,719 | 7/1985 | Frey | 17/49 |

Primary Examiner—Willie G. Abercrombie
Attorney, Agent, or Firm—Howard M. Ellis; Michael L. Dunn

[57] ABSTRACT

Apparatus and methods for stuffing food casing to produce sausage products with a high degree of dimensional uniformity for prepackaging applications. Substantially flat terminal end portions for higher product yields are prepared by a stuffing sequence which includes a time delay from shut down of the meat pump to actuation of the end-closure device. The length of the delay in actuating the end-closure device is dependent on the time required for pressure in the stuffing horn to dissipate after shut-down of the meat pump.

9 Claims, 6 Drawing Sheets

APPARATUS AND METHODS OF STUFFING FOOD CASINGS TO PROVIDE DIMENSIONALLY UNIFORM PRODUCTS

This application is a continuation-in-part of application Ser. No. 002,831, filed Jan. 13, 1987, now U.S. Pat. No. 4,709,450, issued Dec. 1, 1987.

BACKGROUND OF THE INVENTION

The present invention relates generally to a new and useful apparatus and method for packaging food products, and more specifically, to improved devices and methods for more economic packaging of sausage products in tubular food casings.

In the manufacturing of sausage products, meat emulsion is prepared from comminuted meat together with fillers, seasonings, spices, etc. A tubular food casing, such as nonedible cellulose, is loaded onto the stuffing horn of a filling machine and stuffed with the meat emulsion. In the case of small sausage products, like frankfurters, the filled casings are twisted, tied or clipped into suitable links at predetermined intervals and further processed. For larger sausage products, like bologna, salami, and the like, the meat emulsion is introduced into larger, heavier walled fibrous type casings and formed into chubs or lengthy individual sausage sticks.

In preparing large diameter sausage products, like bologna, an important consideration is the maintenance of accurate size control over the entire length of the sausage stick. It is important that the diameter of large sausage products be controlled very carefully so that meat packers are able to cut the sausage into slices of predetermined thickness and diameter for prepackaging. The objective is to have a given number of slices weigh precisely a predetermined amount for each package. In other words, a given number of slices should weigh exactly one pound or some other preselected weight.

A further important consideration in the preparation of large diameter sausage products for prepackaging concerns end portions. Sticks, having either tapered ends or enlarged bulbous ends, provide poor yields. The end portions of a bologna, for example, which are either undersized or oversized can result in the loss of up to five inches of meat from each end of the sausage product, since off-spec slices cannot be used for prepackaged meat products. In addition to forming packages which fail to meet required preselected weight standards, sliced product prepared from sticks having bulbous ends cannot be enclosed in display packages.

As a result of the problem of filling equipment forming packages with ends which result in substantial waste, meat processors and equipment manufacturers are constantly striving to improve both operations and machines that affect finished package yield. For example, U.S. Pat. No. 3,621,513 discloses a stuffing apparatus which is capable of forming sausages with a variety of end portion configurations, including tapered, elongated ends and taut ends whose rounded end portion have been reduced and minimized. To prepare filled casings with taut, nontapered ends, when the flow of emulsion is terminated a dished shaped platen is needed to compress and aid in shaping the trailing end of the filled casing by moving downstream from the stuffing horn outlet against the filled casing. Simultaneously, an internal casing presizer engaged with the stuffing horn is maintained in an expanded, operative mode to restrain the release of unfilled casing from the horn. Consequently, increased pressure is exerted against the trailing end of the filled casing by the dished platen. While in this position a clipper unit is actuated to close the casing.

Filled casings with tapered ends may also be prepared with the apparatus of U.S. Pat. No. 3,621,513. In this regard, elongated ends are formed by contracting the casing presizer to release unfilled casing from the horn after operation of the food pump is terminated. The dished platen is then moved downstream from the stuffing horn stripping casing from the horn while permitting some of the food emulsion to flow upstream into the unfilled loose casing where the casing is clipped. Accordingly, the methods and apparatus of U.S. Pat. No. 3,621,513 are dependent on a multiplicity of components, including concentric sleeve casing presizer, casing brake, emulsion stopping ring, dished platen, casing clippers, etc.

U.S. Pat. No. 4,562,617 discloses means for preparing dimensionally uniform filled food casings with nontapered ends. The uniform filled casings are prepared by introducing with the food product "a closing piece" inside the casing at the terminal ends. The closing pieces occupy interior space which otherwise would have been filled with meat emulsion to produce tapered ends. U.S. Pat. Nos. 4,028,775 and 4,160,305 also relate to apparatus and methods of inserting sizing discs into tubular casings.

U.S. Pat. No. 3,454,980 to H. G. Washburn and U.S. Pat. No. 3,553,768 to G. M. Wilmsen also disclose means for sizing control in stuffing operations. Devices disclosed therein rely on tubular sleeves for improving sausage diameter uniformity. Variations in sausage diameter are corrected by means of an annular ring which engages a conical face on the edge of the stuffing horn to control the rate of casing feed off the horn. Thus, to enlarge undersized sausage to a predetermined diameter during the stuffing cycle, pressure of the annular ring against the casing on the edge of the stuffing horn is increased in order to increase the friction and slow the rate at which unfilled casing is released from the horn. Similar adjustments are made in correcting for oversized diameters during the stuffing cycle, except that frictonal pressure against the casing on the horn is reduced allowing the empty casing to be released more freely from the horn.

According to U.S. Pat. No. 3,454,980 variations in sausage diameter are constantly monitored and automatically corrected by a pneumatic sensing device in combination with a fluid motor, the latter of which controllably adjusts the frictional pressure applied to the casing at the conical edge of the stuffing horn by lateral movement of the annular ring. Although the Washburn and Wilmsen devices are effective in achieving accurate size control, they do not provide means for restricting the backflow of food emulsion over the stuffing horn during the closure cycle. In addition, no specific means are provided for making substantially flattened terminal ends for minimizing potential waste and lower product yield.

A further sizing apparatus is disclosed by Niedecker in U.S. Pat. No. 3,748,690 wherein an axially slideable snubbing element on the stuffing horn is displaced forwardly downstream after the completion of the filling cycle to push or release unfilled casing from the horn when the clipper gates are actuated. Like many of the foregoing filling machines, the methods of Niedecker fail to provide means for minimizing tapering or enlarged rounded ends. Accordingly, there is need for a sausage stuffing apparatus with improved sizing control means for making filled casings with terminal end portions which are neither tapered nor enlarged, such improved means not being dependent either on the introduction of special casing inserts or multiple machine components.

SUMMARY OF THE INVENTION

The present invention relates generally to methods and apparatus for automatically stuffing shirred food casings, and especially for preparing large size sausage products for prepackaging which products are dimensionally uniform and have substantially flat terminal end sections.

Although the methods and apparatus described herein may be used for stuffing nonfibrous, unreinforced food casings, including casings of relatively short length, they are especially desirable for stuffing shirred fibrous, reinforced type casings which have been pleated into individual strands of substantial length, e.g. 200 feet or more, or stuffing multiple large size sausage and other food products, such as bolognas, salamis, etc. The fibrous casings may include premoistened, ready-to-stuff types sufficiently moistened for stuffing at the time of their manufacture. Alternatively, conventional strands of fibrous casing may be used requiring soaking immediately prior to stuffing.

Because the stuffed food products are uniform in diameter, end-to-end, meat packers are able to cut them into slices of predetermined thickness and diameter for prepackaging with the expectation of forming packages of identical weight. Sticks so formed have higher average product yields due to substantially flat, nontapered, nonrounded ends.

Generally, the stuffing apparatus of the present invention comprises a stuffing horn with an inlet for receiving a presurized food material, e.g. sausage emulsion from a food pump, an outlet downstream from the inlet for delivering the food material to a casing loaded onto the stuffing horn and a shaft intermediate to the inlet and outlet of the stuffing horn; means for engaging the casing against the shaft of the stuffing horn for restricting the rate of release of casing therefrom; carriage means for translating the casing engaging and restricting means along the axis of the stuffing horn; the casing engaging and restricting means including means for preventing the backflow of food material when the backflow preventing means is removed from the shaft of the stuffing horn; means for closing off filled casing, and means for controlling the length of the interval from actuation of the closing off means to actuation of the carriage means for removing the backflow preventing means from the shaft of the stuffing horn.

In one embodiment of the invention, the casing engaging and restricting means can comprise a resilient sizing ring for engaging the casing circumferentially against the stuffing horn, means for applying compressive forces uniformly to the sizing ring to regulate the rate of release of unfilled casing from the stuffing horn during the filling cycle, motor means for driving the carriage means with the casing engaging and restricting means downstream sufficiently to remove the sizing ring from the stuffing horn during the closing cycle allowing the release of unfilled casing from the horn while also preventing the backflow of food material over the exterior surface of the stuffing horn.

The present invention also includes apparatus for packaging sausage products which are dimensionally uniform and have substantially flat terminal ends in which the apparatus does not require removing the sizing ring/backflow preventing means from the shaft of the stuffing horn. This later embodiment comprises pump means for pressurizing a food material; a stuffig horn with an inlet for receiving the pressurized food material; an outlet downstream from the inlet for delivering the pressurized food material to a casing on the stuffing horn and a horn shaft intermediate to the inlet and outlet; means for engaging the interior surface of the casing for deshirring and smoothing casing on the horn before being filled with food material; means for engaging the exterior surface of deshirred casing for restricting the rate of release of said casing from the horn during stuffing; means for closing-off filled casing, and means for controlling the length of a delay between shut down of the pump means after filling the casing and actuation of the means for closing off filled casing, said delay being directly proportional to the viscosity of the food material. The expression "directly proportional" is intended to mean that as the viscosity increases the time delay increases whether or not in a direct linear relationship.

In addition to the foregoing apparatus, the present invention also includes methods for stuffing shirred strands of food casing comprising the steps of loading a strand of the casing for stuffing at a filling station during the filling cycle; stuffing the casing with the food material at the filling station while applying a force to restrict the rate at which unfilled casing is released for stuffing; closing the trailing end of the filled casing at the clipping station during the closing cycle, and controlling the interval for withdrawing the force restricting the rate of release of unfilled casing at the filling station when the trailing end of the filled casing is closed so that the length of the interval is directly proportional with the viscosity of the food material at the time of the filling cycle. That is to say, in order to form ends which are substantially flat and which are neither tapered nor rounded/bulbous the force restricting the release of unfilled casing is maintained for an interval which is directly proportional to the flow properties of the emulsion. Thus, when the food material at the time of stuffing has a relatively low level of resistance to flow the interval between actuation of the clipper mechanism for closing the trailing end of the filled casing and removal of the sizing ring from the stuffing horn to release unfilled casing is substantially nil. That is, the end-closure mechanism and the mechanism releasing unfilled casing are actuated substantially simultaneously. However, as the food material becomes less fluid and more stiff/viscous, as in cold stuffing, the delay for releasing unfilled casing at the time the clipper mechanism is actuated increases.

In preparing stuffed products of uniform diameter for prepackaging with ends which are also substantially flat and which are neither tapered nor rounded, methods of the invention also include the steps of loading a strand of shirred casing for stuffing at a filling station; deshirring and smoothing the casing at the filling station; delivering a food material to the casing at the filling station while applying a force to restrict the rate at which casing is released for stuffing; terminating the delivery of food material to the filled casing; closing-off the trailing end of the filled casing at a clipping station, and controlling the interval from the time of terminating the delivery of food material to closing-off the trailing end of the filled casing so that the length of delay before closing-off the casing is directly proportional to the viscosity or flow properties of the food material. Thus, besides controlling the interval or delay in removing the sizing ring from the stuffing horn to release unfilled casing at the filling station after the trailing end of a filled casing is closed, substantially flat, nontapered ends can also be made during stuffing without necessarily removing the sizing ring from the horn, by delaying actuation of the closure mechanism for a sufficient time period to allow residual pressure in the stuffing horn and emulsion pipeline to substantially "relax" or abate, after the casing has been filled and the meat pump has been shut down.

The length of delay or interval is usually dependent on the flow properties of the food material so, for example, a meat emulsion which is maintained at a low temperature for cold stuffing will require a longer time interval for residual pressure in the emulsion line to dissipate or fade before a chub clip is installed. This is because a cold meat emulsion will be stiff and viscous, and will require a longer period for the pressure in the emulsion line to "relax" after shutdown of the meat pump. In contrast, a meat emulsion closer to normal room temperature conditions generally will be less stiff and viscous, and will have faster flow properties. Under these circumstances, it will require a shorter time interval for residual pressures in the emulsion line to fade and the delay in closing-off the filled casing after shut-off of the food pump may be nil. In other words, depending on the flow characteristics of the food product methods of the present invention even contemplate closing-off a filled casing substantially without a time delay after shut-down of the food pump. The actual delay between shut-off of the food pump to actuation of the closure mechanism to obtain ends which are substantially flat, and neither bulbous nor tapered, can be ascertained through exercise of ordinary skills.

As previously indicated, the methods and apparatus of the present invention also contemplate embodiments where removal of the sizing ring from the stuffing horn can be made optional. In this regard, a horn or presizing ring of known design can be positioned on the shaft of the stuffing horn for use in combination with the sizing ring for purposes of deshirring and diametrically stretching the casing before filling and for more optimal circumferential size control during the stuffing cycle. Use of a horn ring allows the sizing ring to remain on the horn at the outlet end throughout the filling and closing cycles. By positioning and retaining the sizing ring on the horn through the closing cycle any food displaced upstream by the compressive action of the gathering gates of the end-closure mechanism can be maintained at the outlet end of the horn without being forced into the space between unfilled casing and the outside wall of the stuffing horn.

Because the outer rim of the presizing ring presses against the internal wall of the casing, deshirring, smoothing and preferably diametrically stretching the pleated film frictional resistance is created which aids in controlling the rate of release of casing from the stuffing horn while providing further sizing control during the filling cycle. As a result, compressive forces exerted downstream by the sizing ring against the external wall of the casing can be substantially reduced over pressures which would otherwise be applied without a horn/presizing ring. The stretching action of the horn ring also provides unfilled casing in the form of a "pocket" at the outlet end of the stuffing horn to receive food material displaced upstream during the closing cycle when the closure gates are actuated. This reduces the risk of ruptured casing during the closing cycle without the need for either removing the sizing ring from the stuffing horn or further modification of the compressive forces being applied against the casing and stuffing horn to permit further release of film from the horn at this stage.

Accordingly, the present invention ensures product uniformity with substantially flat ends while eliminating constant movement and adjustments of the sizing ring and pressure exerted against the casing during the stuffing and closing cycles.

DESCRIPTION OF THE DRAWINGS

For a further understanding of the invention as well as its characterizing features, reference should now be made to the following detailed description thereof taken in conjunction with the accompanying drawings, wherein.

DETAILED DESCRIPTION OF THE INVENTION

Figure 1:
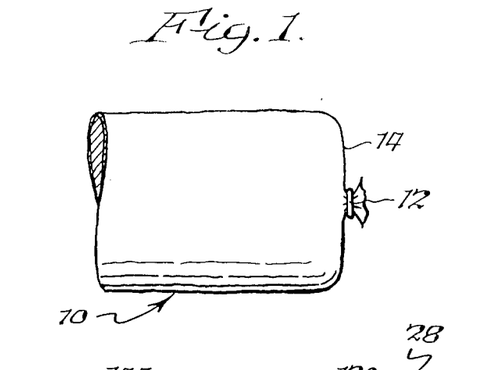
FIG. 1 is a partial side view of a representative filled food casing prepared according to the present invention.
Figure 2:
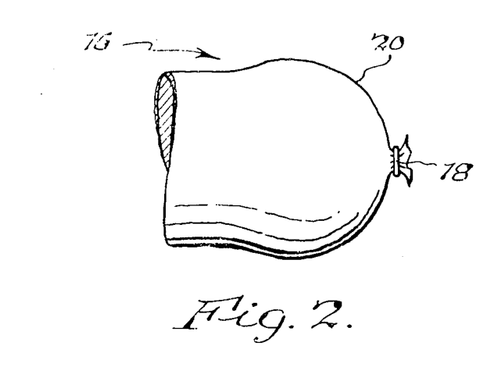
FIG. 2 is a partial side view of a filled food casing having rounded/bulbous ends.
Figure 3:
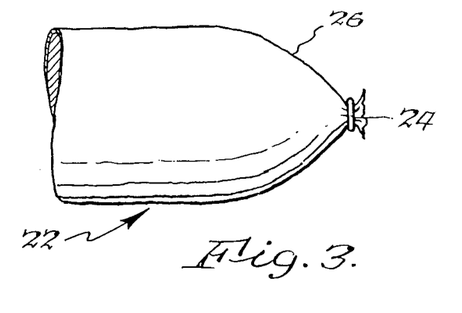
FIG. 3 is a partial side view of a filled food casing having tapered ends.

Turning first to FIG. 1 there is shown a partial view of a dimensionally uniform filled casing 10 with an end-closure clip 12 wherein terminous portion 14 of the filled product is substantially flat. Because filled casing 10 is dimensionally uniform, end-to-end the majority of terminous portion 14, which is neither undersized nor oversized, can be sliced by food processors with the expectation that they can be satisfactorily used in prepackaging. FIG. 2 provides a partial view of a filled casing 16 with an end-closure clip 18 and an enlarged terminous portion 20 which is rounded/bulbous in shape compared to end portion 14. Similarly, FIG. 3 illustrates a filled casing 22 with an end-closure clip 24 and an undersized terminous portion 26 which has a tapered shape. Product yield for sliced prepacked sausage, e.g. bologna, prepared from sticks having either oversized or undersized end portions, like those shown in FIGS. 2 and 3, provide substantially lower product yield than sticks having substantially flat end portions like those of FIG. 1. The oversized and undersized terminous portions 20 and 26 of sticks 16 and 22, respectively would have to be removed as waste before the balance of the stick could be cut into slices of uniform weight and diameter.

Figure 4:
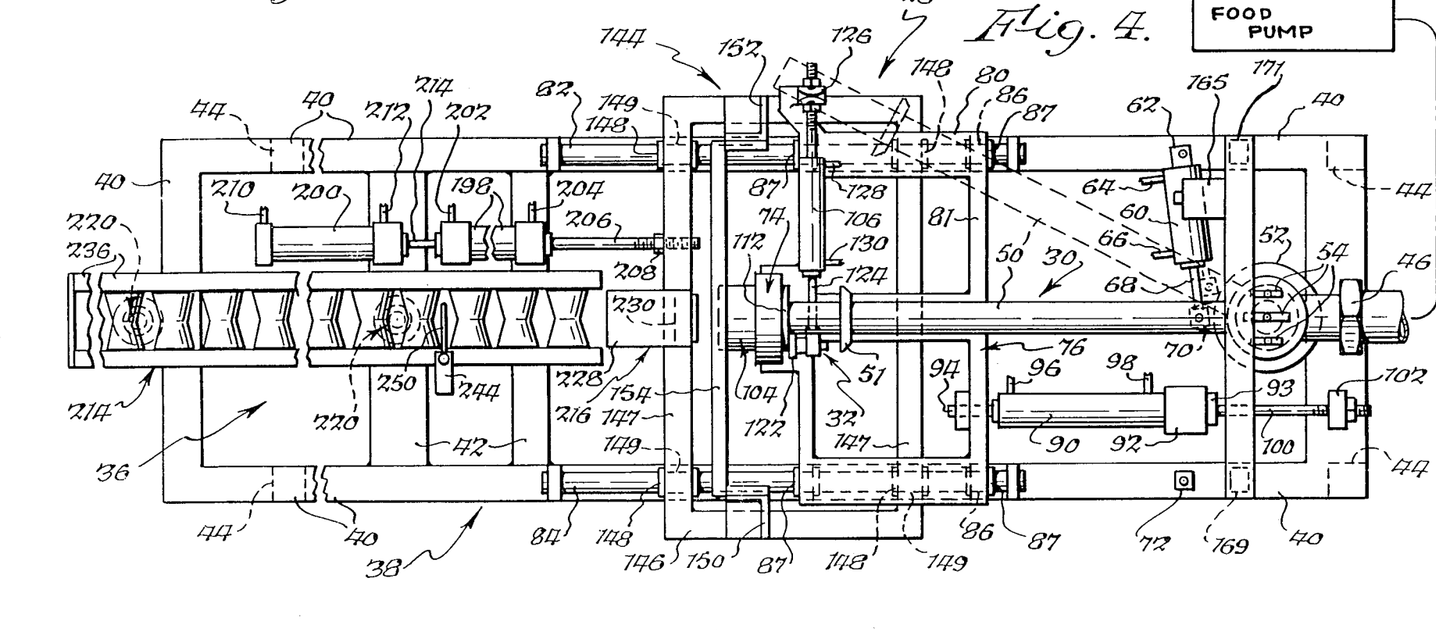
FIG. 4 is a top plan view of the apparatus with certain parts removed for clarity.
Figure 5:
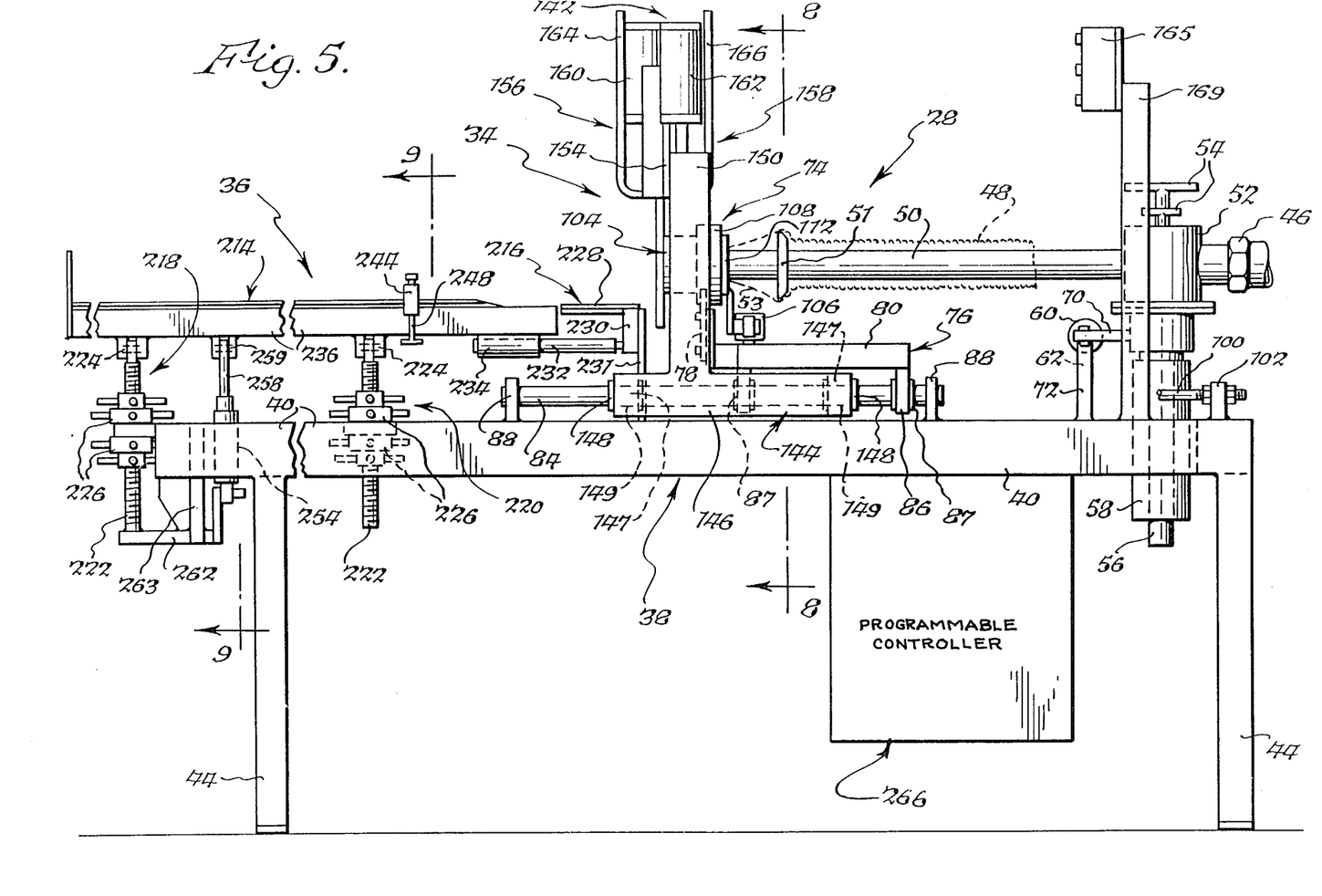
FIG. 5 is a side elevational view of the apparatus of FIG. 4 with certain parts removed for clarity.

Food sticks according to FIG. 1 can be prepared with stuffing apparatus 28 (FIG. 4) consisting of four main sections: a food delivery section 30, a product sizing section 32, a product closing section 34 (FIG. 5), and a product receiving and discharging section 36 (FIGS. 4 and 5). The four sections are mounted on a frame assembly 38 comprising an outer frame 40 with cross supports 42, all supported by leg members 44.

The food delivery section 30 is intended for receiving a pressurized food material, e.g. meat emulsion, from a meat pump upstream of the apparatus. The pump is joined at tubular connection 46 for transporting the pressurized food to a casing, usually a pleated strand of tubular material 48 (FIG. 5), at the outlet end of the stuffing horn 50. More specifically, a meat emulsion or other stuffable food product is received by a horn assembly comprising a stuffing horn 50 with a concentrically mounted horn or presizing ring 51 in which the stuffing horn is detachably joined to a rotatable hub 52 by means of connectors 54. The hub accommodates horns of varying size depending on the diameter of the casing being filled. The hub 52 is supported for rotational movement through an internal connecting shaft 56 (FIG. 5) which pivots in a stationary sleeve 58 mounted to frame 40. Articulation of hub 52 and stuffing horn 50 from a central position (FIG. 4) to an off center position shown by broken lines provides convenient access for loading shirred casing onto the horn.

Rotational drive for the horn and hub is provided by fluid motor 60 detachably connection to frame 40 through support member 62. Motor 60 includes fluid lines 64 and 66, the rod 68 connected to the hub through yoke extension 70. Actuation of fluid motor 60 to retract rod 68 causes a pivoting movement of the hub and of the outlet end of the horn to the side loading position. Extension of rod 68 of motor 60 returns horn 50 to center operating position. It should be noted, that for operator convenience fluid motor 60 can also be connected to the opposite side of frame 40 through support member 72 (FIG. 4) so that retraction of rod 60 will cause the outlet end of the horn to pivot to the opposite side of the apparatus. This will provide added flexibility for operators in setting up conveniently positioned work stations for greater accessibility for more efficient operation of the machine.

Product sizing section 32 provides means for making dimensionally uniform filled casings during the stuffing cycle. The principal elements of the product sizing section are casing brake assembly 74 for engaging and compressing the exterior wall of unfilled casing against the horn for restricting the rate of release of casing, axially translatable carriage 76 for the casing brake assembly and presizing ring 51 mounted on the shaft of the stuffing horn for engaging the interior wall of the casing forming deshirred and stretched casing 53 (FIG. 5). The casing brake assembly shown in FIG. 5 is mounted to carriage 76 through flange 78. Carriage 76 includes a slideable platform 80 comprising cross supports 81 mounted on spaced parallel rails 82 and 84 (FIG. 4) through openings in multiple platform legs 86. The openings in platform legs 86 are lined with bushings 87. Rails 82 and 84 are mounted to outer frame members 40 through rail connectors 88.

Carriage 76 is driven by fluid motors 90 and 92, connected to one another in a back-to-back arrangement, wherein the front end of motor 90 has its rod 94 engaged with cross-support 81. When actuated via fluid lines 96 and 98 motor 90 extends rod 94 downstream moving carriage 76 sufficiently to clear casing brake assembly 74 from the horn so that the horn is free to be pivoted sidewardly to casing loading position. After returning the horn to stuffing position, rod 94 is retracted to return the carriage and casing brake assembly so that the latter is positioned over the horn during the stuffing cycle.

Figures 6, 7:
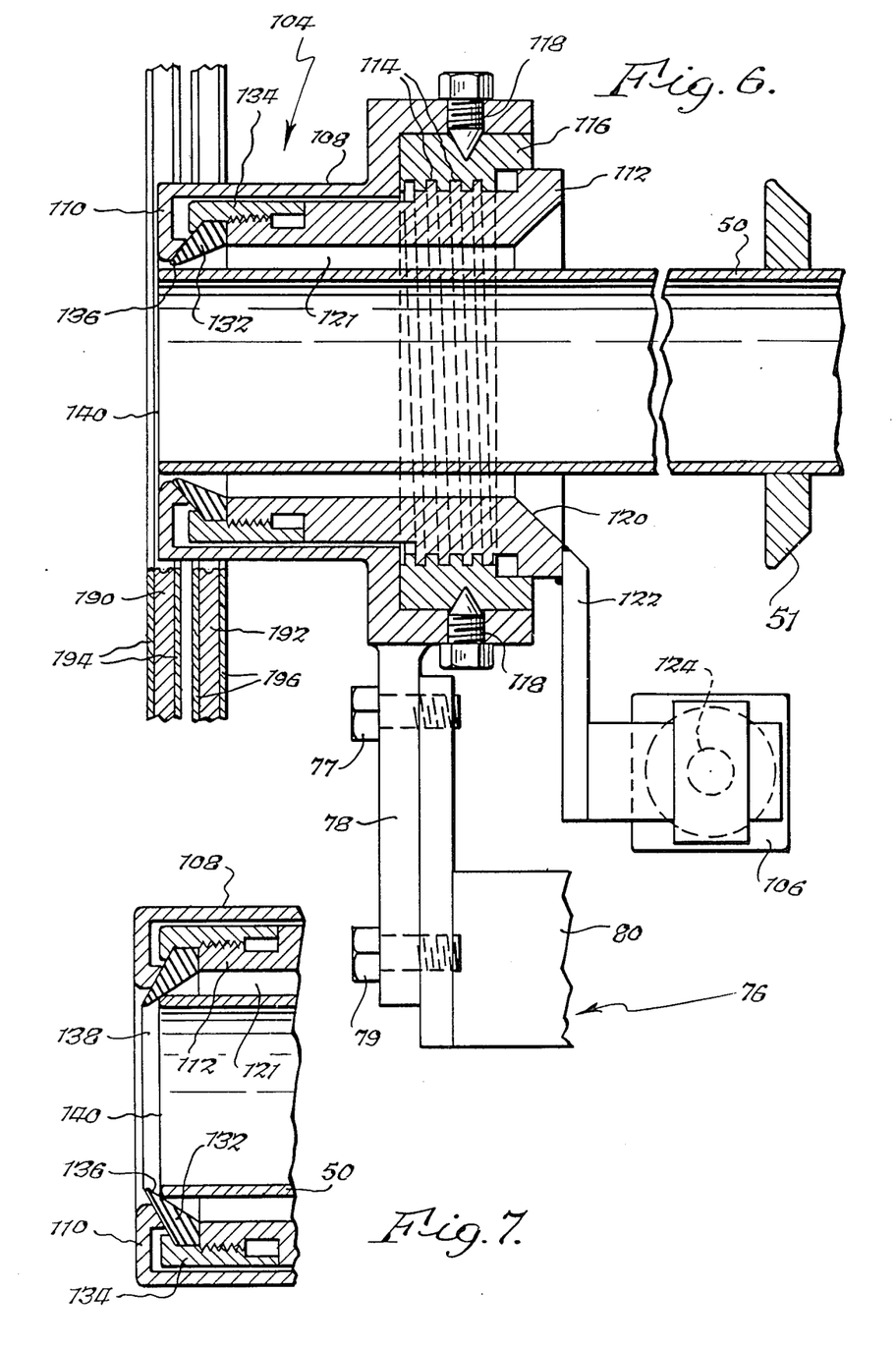
FIG. 6 is a side sectional view of the casing engaging and restricting means with sizing ring engaged with the shaft of the stuffing horn during the filling cycle, taken along line 6—6 of FIG. 8.
FIG. 7 is a partial side sectional view of the casing engaging and restricting means of FIG. 6 with the sizing ring moved off the shaft of the stuffing horn during the closing cycle.

As previously indicated, the back end of fluid motor 92 is linked to the back end of fluid motor 90. Fluid motor 92 has a rod 100 affixed to outer frame 40 through connector 102. Because rod 100 is anchored to the frame actuation of motor 92 will result in cylinder body 93 pushing motor 90, carriage 76 and casing brake assembly 74 downstream from the stuffing horn approximately ¼ inch so as to remove the sizing ring of casing brake 104, discussed in further detail below, from the stuffing horn (FIG. 7).

Assembly 74 comprises casing brake 104 and fluid motor 106 as drive means for adjusting the tension applied against the casing on the stuffing horn. Brake 104 includes an outer housing 108 (FIG. 6) with a lower mounting flange 78 for connecting with bolts 77 and 79 to platform 80 of carriage 76. Housing 108 is also equipped with an outer retaining plate 110 for sizing ring 132. A sleeve 112 mounted inside housing 108 has outer surface threads 114 for engaging with inner threaded collar 116 held in the interior of housing 108 by retaining pins 118. The backside of sleeve 112 includes a funnel shaped casing guide 120 to facilitate deshirring in the absence of horn ring 51 and throughput of empty casing through casing channel 121 from the stuffing horn during filling. Sleeve 112 is also equipped with arm 122 for linking to rod 124 of motor 106. Fluid motor 106 is anchored to platform 80 through connector 126 (FIG. 4). Introduction of fluid via lines 128 and 130 will extend or retract rod 124 and rotate sleeve 112 through arm 122 moving it axially along the shaft of the stuffing horn. Accordingly, sleeve 112 performs as a compression ring for resilient sizing ring 132. That is, extension of rod 124 will turn sleeve 112 clockwise, or counterclockwise when retracted, increasing or decreasing the pressure exerted on sizing ring 132. Because of the inner angular slant of the sizing ring, including inner ring retainer 134 and outer retaining plate 110 rotation of threaded sleeve 112 will increase or decrease the compressive force being applied on the sizing ring and the empty casing by the sizing ring lip 136 during stuffing operations. Thus, the diameter of a sausage in the course of filling can be adjusted, for example, if oversized by turning sleeve 112 clockwise to lessen the pressure being applied to empty casing being drawn from the horn.

As previously mentioned, during the stuffing cycle, sizing ring 132 with horn ring 51, which frictionally engages the inside wall of the casing, controls the diameter of the filled product by regulating the rate of release of unfilled casing from the stuffing horn. Sizing ring lip 136 compresses empty casing against the shaft of the horn. As part of the closing cycle, after completion of the filling cycle, actuation of dual clipper mechanisms for gathering the trailing and leading ends of filled and unfilled casing and applying end-closure clips thereto, the casing brake assembly 74 is advanced downstream by actuation of fluid motor 92. More specifically, through this action casing brake 104 is moved axially a short distance to remove sizing ring 132 off the shaft of the horn. Because of the compressive action of threaded sleeve 112 the sizing ring lip 136 forms a flange 138 (FIG. 7) circumferentially about outlet 140 of the stuffing horn. Flange 138 not only performs as a flap valve to prevent the backflow of meat emulsion over the horn exterior during the closing cycle, but also assists in forming filled casing with substantially flat ends (FIG. 1) for greater product yield.

Figure 8:
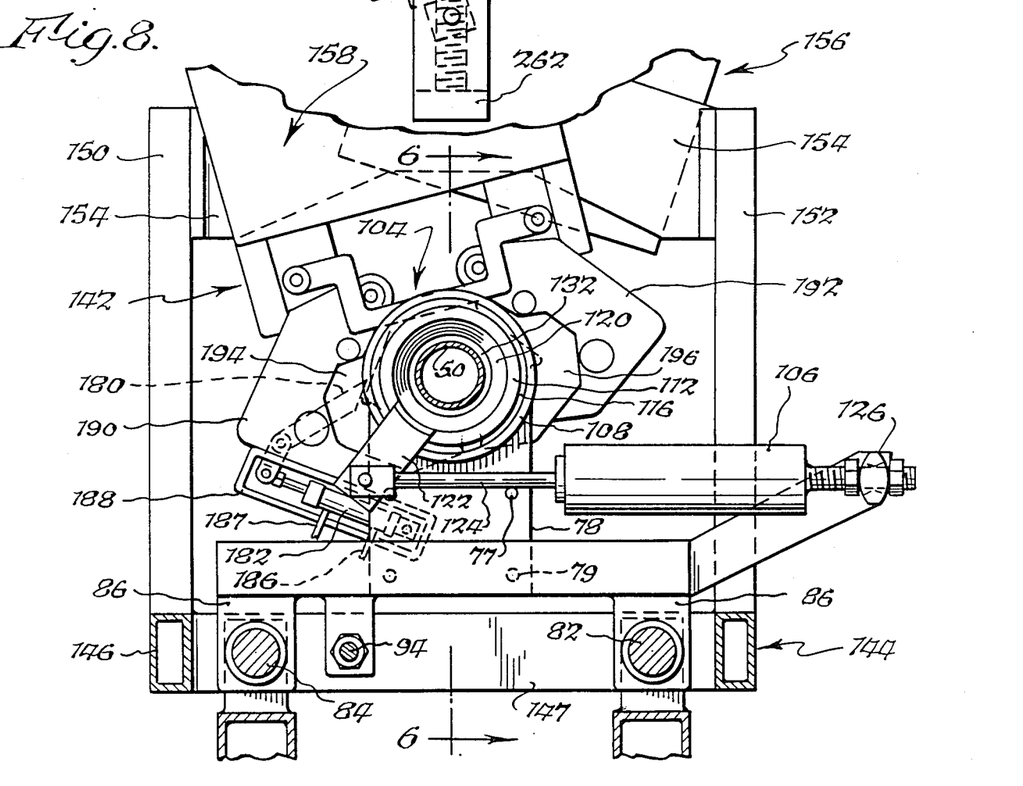
FIG. 8 is a sectional view of the apparatus taken along line 8—8 of FIG. 5 with certain parts removed.

The product closing section 34 (FIG. 5) is comprised of adjacent dual clipper mechanisms 142 (FIGS. 5 and 8) mounted on a clipper carriage 14 (FIGS. 4 and 5) for translation along the axis of the stuffing horn. Clipper carriage 144 is comprised of a rectangular shaped platform 146 formed from multiple welded support members 147. Opposing side support members 147 have aligned openings 149 lined with bushings 148 also for movement on rails 82 and 84. Platform 146 includes parallel vertical supports 150, 152 (FIG. 4), and mounting plate 154 for first and second adjacent clippers 156 and 158 (FIGS. 5 and 8).

First clipper 156 is a chub clipper which compresses the trailing end of a filled casing, gathers the casing of the compressed end and applies an end-closure clip thereto. The second clipper 158, which is adjacent to, but spaced slightly from the first clipper 156, gathers the attached leading end of unfilled casing and applies an end closure clip thereby preparing the next adjacent casing for stuffing. The clippers are essentially identical devices with each having a clip punch mechanism comprising fluid motor 160 and 162 (FIG. 5), a magazine 164 and 166 for automatically feeding clips of conventional design, a punch rod 168, 170 (FIG. 12) and a die member 172, 174 against which the punch rod compresses and closes trailing end clip 176 of a filled casing and leading end clip 178 of the unfilled casing.

Figure 12:
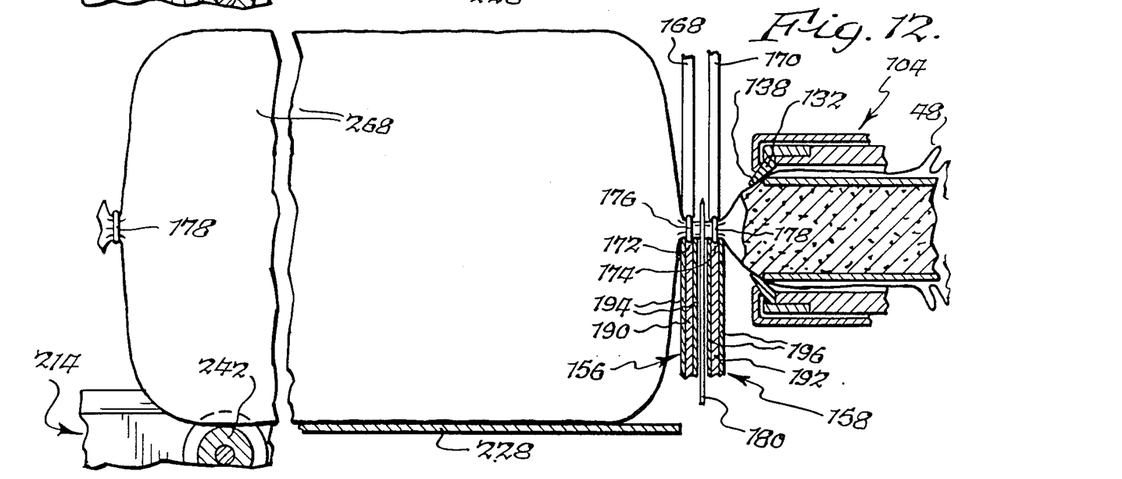

A knife 180 (FIGS. 8 and 12) is disposed between first and second clippers 156 and 158 for severing casing between the trailing and leading end clips 176 and 178. Knife 180 is driven by fluid motor 182 (FIG. 8) having fluid lines 186 and 187. Fluid motor 182 may be affixed to the first or second clipper, for example, through motor mount 188, the latter of which is welded to die gate 190 (FIGS. 8 and 12).

Clippers 156 and 158 each have a die gate 190 and 192 (FIGS. 8 and 12) for supporting dies 172 and 174. In addition, the clippers have spaced opposing gate members 194 and 196 which are offset in a parallel plane and swingable in an interleafed arrangement, as best illustrated by FIGS. 8 and 12. Such clipper devices are available from Tipper Tie, Inc., Apex, N.C., such as Model Z4141. Because of the dimensions of fluid motors 160, 162 to assemble the first and second clipper devices adjacent to one another, the alignment of the devices is offset, as best illustrated by FIG. 8, so that the fluid motors are not directly next to one another.

Clipper carriage 144 is axially moveable on rails 82 and 84 and is driven by a fluid motor 198 which is affixed to cross support 42. Fluid motor 198 comprises fluid lines 202, 204 and rod 206 engaged to support member 147 of the clipper carriage through rod connector 208. Fluid motor 200 comprising fluid lines 210, 212 and rod 214 interacts with motor 198 limiting the return throw of rod 206. That is to say, motor 200 performs as a piston stop limiting the return of the piston (not shown) and rod 206 of motor 198. During the stuffing cycle clipper carriage 144 and rod 206 of motor 198 are fully extended upstream placing the dual clipper mechanism 142 over casing brake 104. During the closing cycle the clipper mechanism 142 is withdrawn from casing brake 104 in a downstream direction. Rod 214 extending into the backside of motor 198 restricts the downstream return of piston and rod 206, so that clipper mechanism 142 is adjacent but in front of casing brake 104. However, in order to load a new strand of casing onto the stuffing horn, the horn must be free to pivot sideways. In other words, in addition to actuating fluid motor 90 for moving carriage 76 and casing brake assembly 74 downstream to make clearance for pivoting the stuffing horn to loading position, dual clipper mechanisms 142 must also be moved downstream. Accordingly, motor 200 is actuated to withdraw the piston stopping action of rod 214 downstream followed by actuating motor 198. Rod 206, clipper carriage 144 and dual clippers 142 are able to be withdrawn to their fullest potential permitting clearance of the stuffing horn to loading position.

Figure 9:
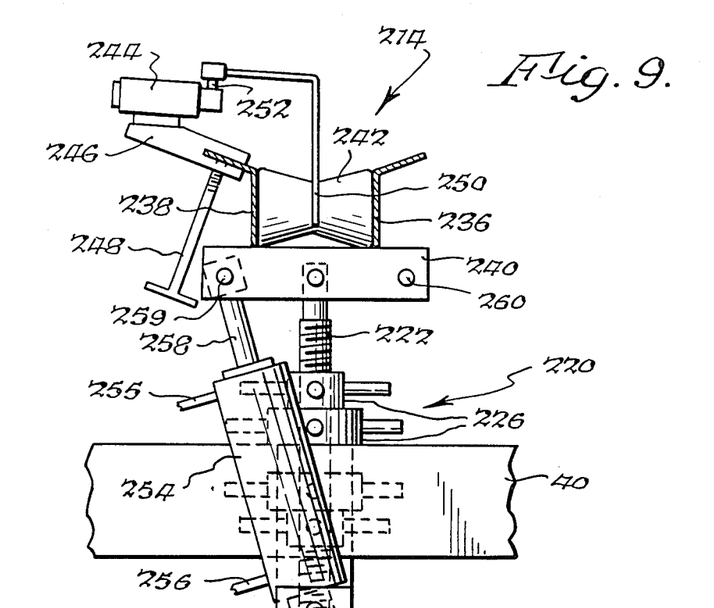
FIG. 9 is a sectional view of the apparatus taken along line 9—9 of FIG. 5.

The product receiving and discharge section 36, best illustrated in FIGS. 4, 5 and 9, provides support for the stuffed food product during the filling and closing cycles and delivers the product from the apparatus for further processing, i.e. cooking, etc. Receiving and discharge section 36 includes a table 214 and table extension 216 (FIGS. 4 and 5). Table 214 is supported by leg members 218 and 220. Each leg has a threaded leg screw 222 engaged to the bottom side of table 214 through connecting hinges 224 (FIG. 5) and to frame members 40 and 42. Adjustments are made in the height of table 214 by turning height adjusters 226.

Table extension 216 is engaged to both table 214 and clipper carriage 144 (FIG. 5). Table extension 216 includes a product receiving platform 228, a vertical tongue-and-groove support assembly 230, a horizontal connecting rod 232 engaged with the tongue-and-groove assembly 230 and a sleeve 234 for rod 232 to slide. Stationary groove 231 of tongue-and-groove 230 is affixed to support member 147 of clipper carriage 144. When the clipper carriage 144 is moved upstream or downstream of the stuffing horn, rod 232 and product receiving platform 228 will move horizontally with the carriage. Likewise, when table 214 is raised or lowered the slidable tongue in the stationary groove will permit raising and lowering of platform 228.

Table 214 (FIGS. 4 and 9) includes spaced parallel sidewalls 236 and 238 flared outwardly at their upper ends. Table base 240 joins the lower edges of sidewalls 236 and 238. Multiple spaced cradled rollers 242 are joined to the parallel ends of sidewalls 236 and 238 to provide a slideable bed for the food product as it is stuffed out.

Product receiving and discharge section 36 also includes controls for limiting the size of the product being stuffed. In this regard, during the stuffing cycle when the stuffed product reaches a predetermined length, the leading end of the product engages length limiting switch 244 (FIGS. 4, 5, and 9) mounted on sidewall 238 (or sidewall 236) of table 214 through mounting flange 246 and fastened by screw member 248. The switch can be mounted at any location along the table depending upon the desired length of the final product. The leading end of stuffed casing engages product contact 250 of switch 244 causing the circuit to open by rotation of shaft 252 terminating operation of the meat pump and further flow of emulsion into the casing. Spaced trailing end and leading end clips 176 and 178 are installed on the trailing end of the filled casing and the leading end of the adjoining unfilled casing and the casing between the two clips severed by means of knife 180. The filled product now on table 214 can be discharged by actuating fluid motor 254 (FIGS. 5 and 9) via fluid lines 255, 256 to extend rod 258 affixed to table base 240 through rod connector 259. For added flexibility and convenience rod 258 can be affixed to connector 260 on the opposite side of base 240 to dump product on the opposite side of table 214. Fluid motor 254 is connected to threaded leg screw 222 through motor mount 262 (FIGS. 5 and 9) and guide rod 263 so that the motor will always be positioned at the proper height for dumping a filled and clipped product.

Figure 10:
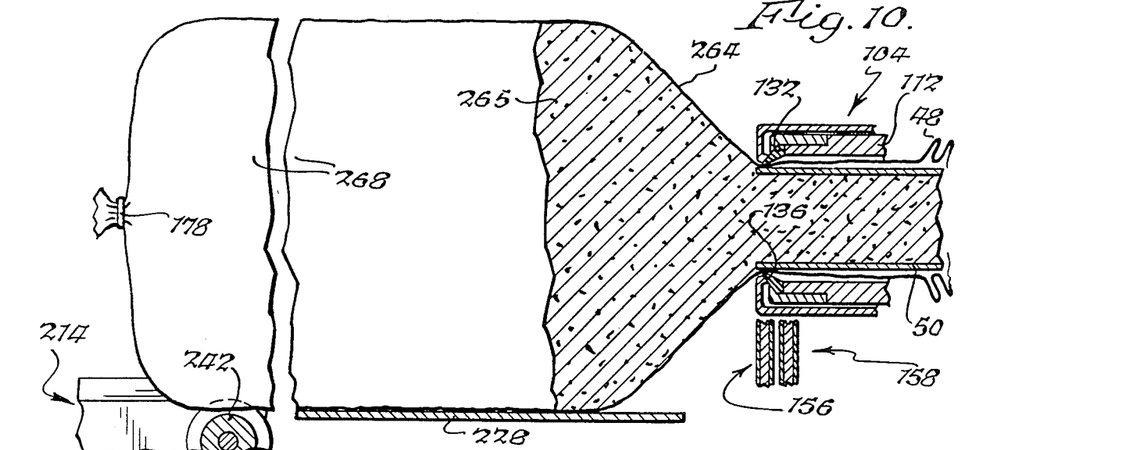
FIGS. 10-12 are elevational, side sectional views illustrating representative steps of stuffing and clipping casing when the sizing ring is removed from the stuffing horn.

The operating sequences of the apparatus are initiated by depressing switches in control box 165 (FIG. 5) elevated by vertical and horizontal supports 169 and 171 (FIG. 4). The sequences are best demonstrated by FIGS. 10–12 and FIGS. 13–15 wherein FIG. 10 illustrates the stuffing cycle with a casing 264, having a leading end-closure clip 178, being filled with a pressurized meat emulsion 265. During the stuffing cycle the first/chub clipper 156 for closing the trailing end of casing 264 is moved upstream along with horn clipper 158 so they are aligned over casing brake 104 (FIG. 10). Lip 136 of sizing ring 132 compresses the unfilled, deshirred casing against stuffing horn 50. The pressure applied by the sizing ring and regulation of product diameter is controlled by sleeve 112 and fluid motor 106. To increase product diameter during the stuffing cycle, the pressure exerted is increased by extending rod 124 and turning sleeve 112 clockwise, or counterclockwise by retracting rod 124 in order to decrease product diameter.

Figure 11:
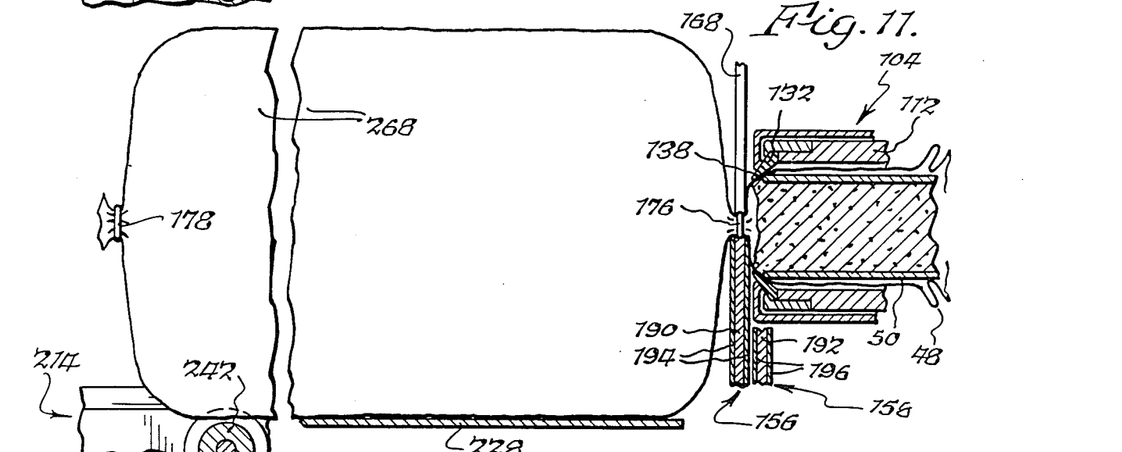

As shown by FIG. 11, at the conclusion of the stuffing cycle chub clipper 156 is moved upstream in front of the stuffing horn 50, and casing brake 104 is advanced upstream sufficiently to remove sizing ring 132 from the horn. A programable controller 266 (FIG. 5) provides the means for regulating intervals for actuating casing brake carriage 76 and clipper carriage 144, including the timing for activation of the individual clippers. More specifically, programmable controller or microprocessor 266 regulates the time interval for first actuating motor 198 retracting chub clipper 156 downstream off of casing brake 104 positioning it in front of the stuffing horn and applying clip 176 to the trailing end of the filled sausage 268. After movement of the chub clipper, sizing ring 132 is advanced downstream after completion of the programmed delay. That is, at a preset time the microprocessor shifts the sizing ring off of the stuffing horn to release additional unfilled casing.

The time delay for activating the casing brake carriage 76 for removing the sizing ring from the horn is regulated according to the physical properties of the food product. Generally, in the case of a nonviscous food material having relatively fast flow characteristics the sizing ring will be removed from the horn to release additional casing substantially simultaneously with actuation of the chub clipper, in order to form a trailing terminal end which is virtually flat. Furthermore, as the viscosity of the food material increases, the time delay in removing the sizing ring from the horn is increased, so with thicker more viscous food products the time delay for removing the sizing ring is also increased proportionately. Accordingly, needed adjustments in timing a particular sequence of activities for a given stuffing operation depending on the flow characteristics can be made by programming controller 266. Exact intervals between actuation of the chub clipper and removal of the sizing ring can be determined through exercise of ordinary skill.

Subsequent to the installation of chub clip 176, the closing cycle sequence includes applying a spaced endclosure clip 178 to the leading end of the adjoining unfilled casing. Motor 198 is activated to retract clipper carriage 144 upstream to move both the trailing end of filled and clipped casing 268 with the chub clipper 156 and horn clipper 158 approximately one inch in front of the outlet of the horn. This will assure that the leading end of the unfilled casing will also have a substantially flat end. After clipper 158 is activated and horn clip 178 has been applied to the leading end of the unfilled casing, the casing between clips 176 and 178 is severed by actuating knife 180. Filled casing 268 is then discharged from dump table 214 by actuating motor 254.

Figure 13:
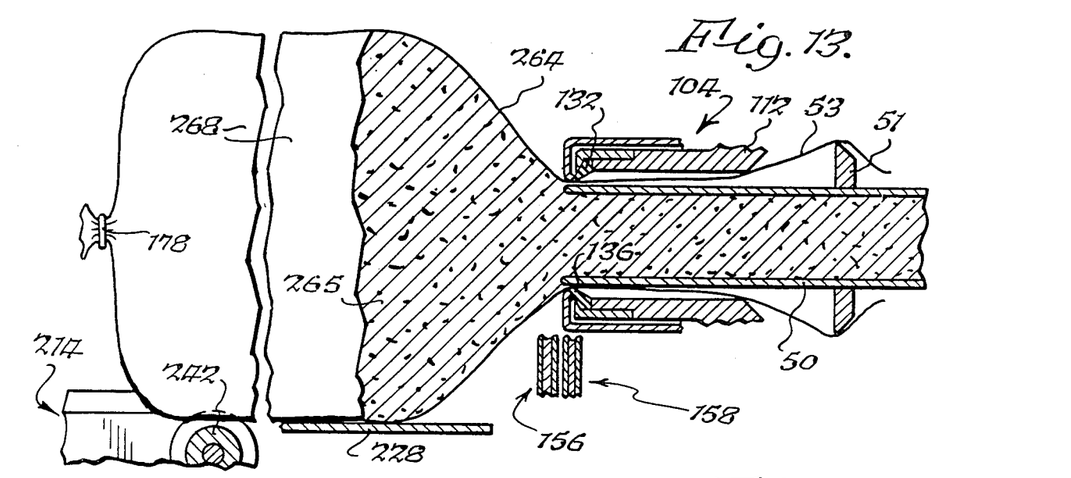
FIGS. 13-15 are elevational, side sectional views representing steps during the stuffing and clipping cycles when a horn ring is employed and the sizing ring is retained on the stuffing horn.
Figure 14:
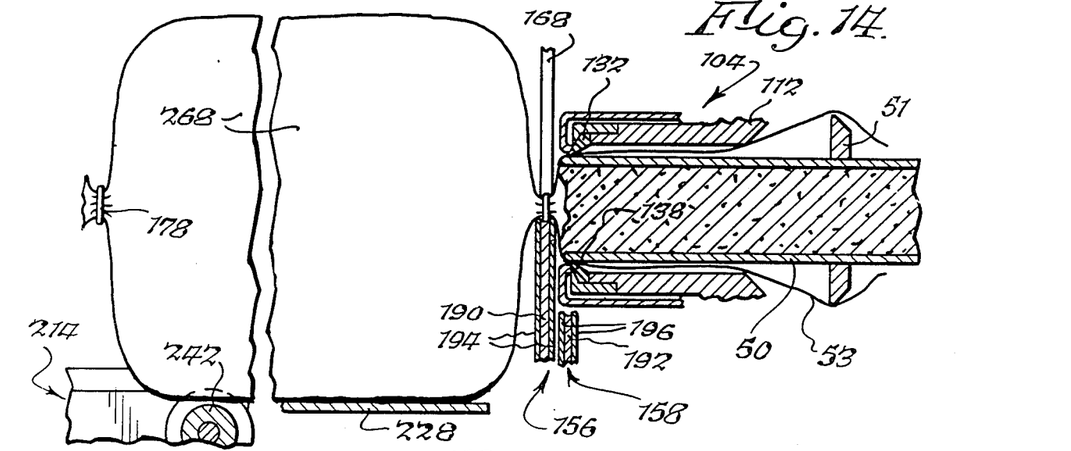
Figure 15:
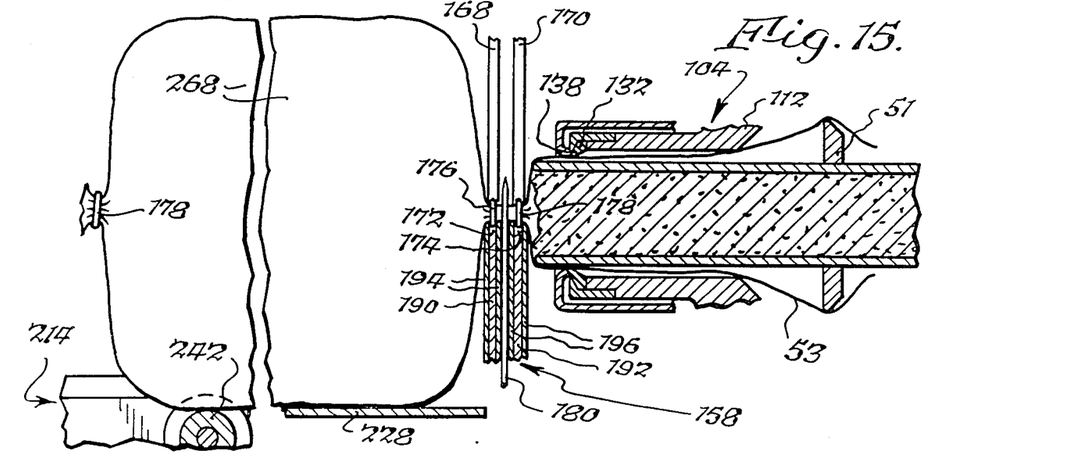

FIGS. 13–15 illustrate sequences for the alternative embodiment where instead of withdrawing sizing ring 132 from the stuffing horn the casing brake 104 remains positioned on the horn near the outlet end during both the stuffing and closing cycles. Horn ring 51 mounted to the stuffing horn is spaced upstream from the sizing ring. During the stuffing cycle (FIG. 13) casing is drawn first over horn ring 51 where it is deshirred and stretched. Because of the stretching action by the horn ring on the casing interior and compression by the sizing ring on the outside of the casing the pressure applied by the sizing ring can be greatly reduced over processes not otherwise utilizing a horn ring. Casing can be withdrawn from the horn as needed without readjusting horn ring pressure and the diameter of the casing being filled is regulated by the sizing ring and horn ring combination.

During the filling cycle (FIG. 13) chub clipper 156 may be positioned approximately 3/16 inch downstream of the stuffing horn outlet while the adjacent horn clipper 158 remains temporarily positioned in alignment with casing brake 104 on the stuffing horn.

Microprocessor 266 (FIG. 5) is programmable to include the appropriate time delay response before initiating the closing cycle after stuffing is completed and the meat pump is shut down. The actual time delay can be determined by exercise of ordinary skill. The delay before actuating clipper gates 156 should only be for that period needed for residual pressure in the stuffing horn to dissipate after the food pump (not shown) is turned off. The period is dependent on, for example, the properties of the food material and its response to temperature. In order to form substantially flat, nontapered ends with a cold, stiff meat emulsion for cold room packaging, longer delays before initiating closure of the chub gates are required because of poor flow properties. By contrast, thin, warmer emulsions may have significantly more rapid flow properties and any delay between termination of the meat pump and actuation of the chub clipper 156 may be substantially nil. Hence, the microprocessor can be adjusted accordingly.

FIG. 14 demonstrates actuation of dual chub clipper gates 194 gathering and compressing the filled casing 268, followed by installation of chub clip 176 by means of punch 168 and the anvil supported by die gate 190. Because the casing at the horn outlet is stretched by horn ring 51 release of extra casing to avoid blow out for displaced food can be obviated.

The microprocessor then advances the chub clipper 156 and horn clipper 158 by activating motor 198 (FIG. 4) to retract clipper carriage 144 upstream to move both the trailing end of the filled and clipped casing 268 and leading end of the unfilled casing and horn clipper so it is about 3/16 inch downstream of the outlet of the stuffing horn (FIG. 15). Gates 196 of the horn clipper 158 gather unfilled casing for applying a closure clip 178 against die 174 supported by die gate 192 for the casing following to be filled. The casing between chub and horn gates is severed by knife means 180.

Although the invention has been described in considerable detail with respect to the preferred embodiments thereof, it will be apparent that the invention is capable of numerous modifications and variations to those skilled in the art without departing from the spirit and scope of the invention as defined in the appended claims.

We claim:

1. A food casing stuffing apparatus comprising pump means for pressurizing a food material; a stuffing horn with an inlet for receiving the pressurized food material; an outlet downstream from said inlet for delivering the pressurized food material to a casing on said stuffing horn and a horn shaft intermediate to said inlet and outlet; means for engaging the interior surface of said casing for deshirring and expanding casing on said horn before being filled with the food material; means for engaging the exterior surface of deshirred casing for restricting the rate of release of said casing from said horn during stuffing; means for closing-off casing, and means for controlling a delay beginning from shut down of said pump means after filling said casing to actuation of said means for closing off said filled casing, said delay being directly proportional to the viscosity of the food material.

2. The stuffing apparatus of claim 1 wherein the means for engaging the interior surface of said casing comprises a generally annular member mounted on said horn shaft, said annular member having an outer perimeter which is larger than the internal circumference of the unfilled, unshirred casing, and the means for engaging the exterior surface of said casing comprises an axially translatable sizing ring positioned downstream from said annular member.

3. The stuffing apparatus of claim 2 wherein the sizing ring includes means for regulating the compressive forces applied against said casing.

4. The stuffing apparatus of claim 2 wherein the axially translatable sizing ring includes carriage means for removing said sizing ring from said stuffing horn.

5. The stuffing apparatus of claim 4 wherein the means for closing off filled casing comprises first and second adjacent clipper devices for gathering end portions of casing, punch means for installing spaced clips to said end portions of casing and means for severing casing between said spaced clips.

6. The stuffing apparatus of claim 5 including carriage means for axial translation of said means for closing off filled casing.

7. A method for stuffing a strand of food casing, which comprises the steps of loading a strand of shirred casing for stuffing at a filling station; deshirring and expanding the casing at the filling station; delivering a food material to the casing at said filling station while applying a force to restrict the rate at which casing is released for stuffing; terminating the delivery of food material to the filled casing; closing off the trailing end of the filled casing at a clipping station, and controlling the delay from the time of terminating the delivery of food material to the time of closing off the trailing end of the filled casing, said delay being directly proportional to the viscosity of the food material.

8. The method of claim 7 wherein the unfilled casing is stuffed with a relatively stiff, viscous meat emulsion and the step of controlling the delay before closing off the trailing end of the filled casing after terminating delivery of said emulsion is deferred for a sufficient time period to allow pressure at the filling station to substantially dissipate.

9. The method of claim 7 wherein the unfilled casing is stuffed with a flowable, relatively nonviscous meat emulsion, and the step of controlling the delay for closing off the trailing end of the filled casing is regulated to occur substantially consecutively after delivery of said emulsion is terminated.

* * * * *